(12) United States Patent
LoRicco et al.

(10) Patent No.: US 9,718,708 B2
(45) Date of Patent: Aug. 1, 2017

(54) ACOUSTOPHORETIC ENHANCED SYSTEM FOR USE IN TANKS

(71) Applicant: FloDesign Sonics Inc., Wilbraham, MA (US)

(72) Inventors: Nicholas M. LoRicco, Coventry, CT (US); Bart Lipkens, Hampden, MA (US)

(73) Assignee: FLODESIGN SONICS INC., Wilbraham, MA (US)

( * ) Notice: Subject to any disclaimer, the term of this patent is extended or adjusted under 35 U.S.C. 154(b) by 397 days.

(21) Appl. No.: 13/866,943

(22) Filed: Apr. 19, 2013

(65) Prior Publication Data

US 2013/0277317 A1    Oct. 24, 2013

Related U.S. Application Data

(60) Provisional application No. 61/636,546, filed on Apr. 20, 2012.

(51) Int. Cl.
*C02F 1/36* (2006.01)
*H04R 23/00* (2006.01)
(Continued)

(52) U.S. Cl.
CPC .............. *C02F 1/36* (2013.01); *B01D 21/283* (2013.01); *H04R 23/00* (2013.01)

(58) Field of Classification Search
CPC .... A61L 2/00; B03B 5/00; B06B 1/00; B06B 1/0644; B01D 17/04; B01D 17/06; B01D 21/00012; B01D 21/28; B01D 21/283; B01D 29/00; B01D 43/00; B01D 65/00; B01J 19/10

USPC ............... 55/15, 277; 73/432.1, 570, 570.5; 75/710; 137/1, 544; 204/152.42, 157.15, 204/193, 573, 661, 666; 209/1, 155–159; 210/188, 193, 251, 523, 708, 738, 748.05; 252/349; 266/170; 310/337; 366/127;
(Continued)

(56) References Cited

U.S. PATENT DOCUMENTS 4,055,491 A     10/1977  Porath-Furedi
4,320,659 A *    3/1982  Lynnworth et al. ............ 73/589
(Continued)

FOREIGN PATENT DOCUMENTS

EP          0 292 470 A1    11/1988

OTHER PUBLICATIONS

Annex to Form PCT/ISA/206—Communication Relating to the Results of the Partial International Search Report, dated Jul. 18, 2013.

*Primary Examiner* — Dirk Bass
*Assistant Examiner* — Hayden Brewster
(74) *Attorney, Agent, or Firm* — Richard M. Klein; Fay Sharpe LLP

(57) ABSTRACT

A system for enhancing the separation of particles or fluids from water is disclosed. A settling tank or skim tank is provided with an open submersible acoustophoretic separator. In a skim tank, the separator captures and holds oil droplets or particles, permitting them to coalesce until they are large enough and have sufficient buoyant force to float to the top of the tank. In a settling or sediment tank, separator captures and holds particles until they are large enough that the force of gravity causes them to settle out of the water. The acoustophoretic device thus speeds up separation of the particles or droplets from the water.

27 Claims, 13 Drawing Sheets

(51) Int. Cl.
*B01D 21/28* (2006.01)
*B01D 21/00* (2006.01)

(58) Field of Classification Search
USPC ..... 367/137, 138, 142, 191; 406/198; 422/1, 422/20, 128
See application file for complete search history.

(56) References Cited

U.S. PATENT DOCUMENTS

| | | | | |
|---|---|---|---|---|
| 4,344,448 | A * | 8/1982 | Potts | 134/73 |
| 4,983,189 | A * | 1/1991 | Peterson et al. | 210/748.02 |
| 5,831,166 | A | 11/1998 | Kozuka et al. | |
| 5,951,456 | A | 9/1999 | Scott | |
| 2004/0149039 | A1* | 8/2004 | Cardelius | G01F 1/662 73/570 |
| 2006/0050615 | A1* | 3/2006 | Swisher | F16M 11/24 367/173 |
| 2009/0126481 | A1* | 5/2009 | Burris | G01F 23/2962 73/290 V |
| 2011/0123392 | A1* | 5/2011 | Dionne et al. | 422/1 |
| 2013/0284271 | A1* | 10/2013 | Lipkens | B01D 43/00 137/1 |

\* cited by examiner

ACOUSTOPHORETIC ENHANCED SYSTEM FOR USE IN TANKS

The present application claims the benefit of U.S. Provisional Patent Ser. No. 61/636,546, filed Apr. 20, 2012. The entirety of that application is hereby incorporated by reference in its entirety.

BACKGROUND

The present disclosure relates to waste treatment systems and to devices that can be used to accelerate the separation of solid particles or fluids. Also disclosed are methods of separation.

Wastewater from sewage or industrial wastes can include suspended particles and other fluids besides water. Waste treatment systems are designed to separate these undesirable wastes from the water. One form of treatment equipment is a large tank or vessel which is designed to provide a long residence time.

Sedimentation is the process by which suspended particles heavier than water are removed by gravitational settling to the bottom of such a tank. In addition, lighter-than-water fluids, such as fats or oils, will rise to the top of such a tank. A "settling tank" is the term generally used to describe a tank whose purpose is to remove the sediment that collects at the bottom of a tank. "Sludge" is the term generally used to describe the sedimented material itself. A "skim tank" is the term generally used to describe a tank that is used to capture such fluids that rise to the top of the tank.

FIG. 1 is a side cross-sectional view of one kind of conventional settling tank. The settling tank has an inlet in the center of the tank. Wastewater is distributed as uniformly as possible from the inlet. In the settling zone, water has a very low velocity, allowing suspended solids to sink due to gravity. This creates a sludge zone on the bottom of the tank. The resulting clarified water is captured in a decanting trough and exits the settling tank. A scraper arm on the bottom of the tank pushes the sludge into a sludge collecting trough, and the sludge is thus removed from the settling tank.

FIG. 2 is a side-cross-sectional view of one kind of conventional skim tank. Wastewater is distributed through an inlet in the center of the tank. Lighter-than-water fluid, such as oil will rise, while the water sinks. An oil outlet located at the top of the tank permits removal of the lighter-than-water fluids. A water outlet is located at the bottom of the tank. A skimming arm may be located at the top of the tank to push the lighter-than-water fluid into a collection area.

Stokes' law describes the settling velocity of a suspended particle. The settling velocity is affected by the mass density of the particle, the mass density of the fluid, the dynamic viscosity of the fluid, and the radius of the particle. Some types of particles are difficult to separate from water. This includes small particles, having a radius of less than 6 μm and particles whose density is very close to that of water.

It would be desirable to provide systems, devices, and methods that could accelerate the separation of undesirable waste products from water.

BRIEF DESCRIPTION

The present disclosure relates to systems and devices for performing acoustophoresis in a tank. The devices use an ultrasonic transducer as described herein. The transducer is driven at frequencies that produce multiple standing waves. These standing waves act to separate particles from fluids, or to separate two fluids of different densities, from each other. This can speed up the separation time and enhance the operation of a settling tank or a skim tank.

Disclosed in various embodiments is a method of accelerating separation in a tank, the method comprising: placing a submersible acoustophoretic separator in the tank, the acoustophoretic separator having a transducer, a reflector on a side opposite the transducer, and at least one exposed face; flowing a fluid into the tank, the fluid having a first density and containing particles or droplets having a different density; applying acoustic energy to the fluid with the transducer to create a plurality of incident waves; and reflecting the plurality of incident waves from the reflector, creating a plurality of reflected waves resonating with the incident waves, thus forming a plurality of standing waves in the fluid between the transducer and the reflector, wherein the fluid is separated from the particles or droplets by the standing waves.

Generally, the standing waves create nodal lines and lateral forces that trap the particles or droplets in the nodal lines. The particles or droplets trapped in the nodal lines coalesce or agglomerate such that the particles or droplets are separated from the fluid.

In some embodiments, the at least one exposed face of the submersible acoustophoretic separator is a top face, allowing the trapped particles or droplets to float up out of the separator as they coalesce or agglomerate.

In other embodiments, the fluid is circulated in the tank to move fluid through the separator.

Also disclosed in different embodiments is an apparatus comprising: a tank containing a fluid containing particles or droplets; and an acoustophoretic separator in the tank, the acoustophoretic separator comprising a transducer and a reflector opposite the transducer, wherein the fluid can flow between the transducer and the reflector.

The transducer can include a ceramic crystal made of PZT-8.

The acoustophoretic separator may include a housing that mechanically connects the transducer and the reflector. The housing can be adjustable to vary the distance between the transducer and the reflector.

In particular embodiments, the housing has a transducer face that contains the transducer, a reflector face that contains the reflector, a lower support plate connecting a lower edge of the transducer face to a lower edge of the reflector face, and support rods connecting an upper edge of the transducer face to an upper edge of the reflector face.

The housing can include wheels or treads for propelling the separator on the bottom of the tank. The housing can alternatively include a flotation device.

The separator can be suspended from a boom.

Sometimes, the reflector is formed from a wall of the tank, and the transducer is mounted on a track and is pointed towards the wall of the tank.

Also disclosed in different embodiments herein is a submersible acoustophoretic separator, comprising: a housing having a transducer face, a reflector face opposite the transducer face, a support joining the transducer face and the reflector face, and at least one exposed face; a transducer on the transducer face; and a reflector on the reflector face.

The housing can be adjustable to vary the distance between the transducer face and the reflector face.

The support can be a set of support rods connecting a top edge of the transducer face to a top edge of the reflector face.

The support may alternatively be a lower support plate connecting a bottom edge of the transducer face to a lower edge of the reflector face.

The housing can include wheels or treads for propelling the separator on the bottom of the tank. The separator could further comprise a flotation device.

In yet other embodiments, an apparatus includes a tank and a submersible acoustophoretic separator. The tank contains a host fluid containing particles or droplets. The submersible acoustophoretic separator, in the tank, has a plurality of ultrasonic transducers, the transducers each including a ceramic crystal driven by an oscillating, periodic, or pulsed voltage signal of ultrasonic frequencies which drives the transducers to vibrate in a non-uniform mode of displacement to create standing waves in the flow channel. The separator also includes a reflector located on the wall on the opposite side of the flow chamber from the transducers.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
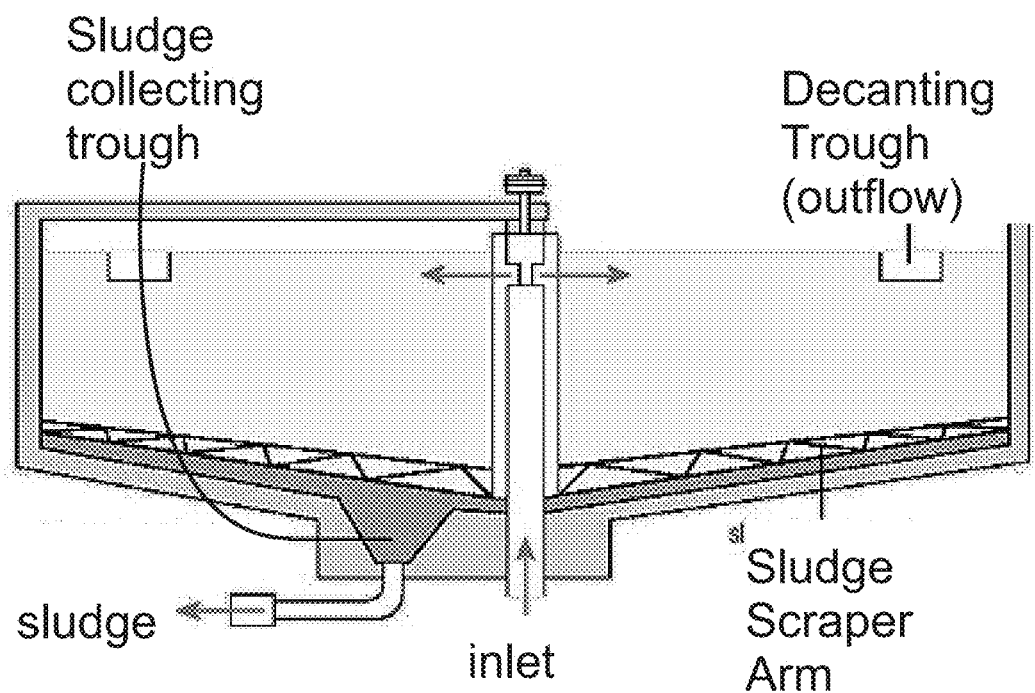
FIG. 1 is a side cross-sectional view of a conventional settling tank.

The present disclosure may be understood more readily by reference to the following detailed description of desired embodiments and the examples included therein. In the following specification and the claims which follow, reference will be made to a number of terms which shall be defined to have the following meanings.

The singular forms "a," "an," and "the" include plural referents unless the context clearly dictates otherwise.

As used in the specification and in the claims, the term "comprising" may include the embodiments "consisting of" and "consisting essentially of."

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4."

Some of the terms used herein are relative terms. The terms "inlet" and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the flow fluids through an upstream component prior to flowing through the downstream component. The terms "upper" and "lower" are relative to a central point. An upper component is located in one direction from the central point and a lower component would be located in the opposite direction from the central point.

The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other. The terms "top" and "bottom" or "base" are used to refer to surfaces where the top is always higher than the bottom/base relative to an absolute reference, i.e. the surface of the earth. The terms "upwards" and "downwards" are also relative to an absolute reference; upwards is always against the gravity of the earth.

The present disclosure refers to suspended solids, particles, and droplets. "Solids" and "particles" should be considered to refer to materials that are denser than water, while "droplets" refers to materials that are less dense than water. However, these three terms also share a common characteristic of being suspended or dispersed in water, and are desirably separated from the water. Depending on the context, reference to any one of these terms should be construed as referring to any of these three terms due to this common characteristic, and thus should not be construed as somehow being limited to only the one used term based on density.

As previously mentioned, conventional settling tanks or skimming tanks require a long residence time to allow solids or droplets to either settle to the bottom or float to the top of the tank. It would be desirable to provide systems and devices that can be used to increase the rate of separation of the solids/droplets from the water in the tank.

Acoustophoresis

Acoustophoresis is the separation of particles using high intensity sound waves. It has long been known that high intensity standing waves of sound can exert forces on particles. A standing wave has a pressure profile which appears to "stand" still in time. The pressure profile in a standing wave varies from areas of high pressure (nodes) to areas of low pressure (anti-nodes). Standing waves are produced in acoustic resonators. Common examples of acoustic resonators include many musical wind instruments such as organ pipes, flutes, clarinets, and horns.

Acoustophoresis is a low-power, no-pressure-drop, no-clog, solid-state approach to particle removal from fluid dispersions: i.e., it is used in continuous flow applications to achieve separations that are more typically performed with porous filters, but it has none of the disadvantages of filters. Acoustophoretic phase separator technology using ultrasonic standing waves provides the benefit of having no consumables, no generated waste, and a low cost of energy. The technology is efficient at removal of particles of greatly varying sizes, including separation of micron and sub-micron sized particles, as explained in commonly owned U.S. patent application Ser. No. 13/844,754, which is hereby incorporated by reference in its entirety. Examples of acoustic filters/collectors utilizing acoustophoresis can be found in commonly owned U.S. patent application Ser. Nos. 12/947, 757; 13/085,299; 13/216,049; and 13/216,035, the entire contents of each being hereby fully incorporated by reference.

Acoustophoresis may be used in a continuous flow process or, as described below, can be used to accelerate the separation of particles from water in a tank (either a settling tank or a skim tank, as the case may be).

The acoustic resonator is designed to create a high intensity three dimensional ultrasonic standing wave that results in an acoustic radiation force that is larger than the combined effects of fluid drag and buoyancy, and is therefore able to trap, i.e., hold stationary, the suspended phase. In continuous flow systems, the systems have the ability to create ultrasonic standing wave fields that can trap particles in flow fields with linear velocity exceeding 1 cm/s. Excellent particle separation efficiencies have been demonstrated for particle sizes as small as one micron.

The acoustophoretic separation technology employs ultrasonic standing waves to trap, i.e., hold stationary, secondary phase particles in a host fluid. This is an important distinction from previous approaches where particle trajectories were merely altered by the effect of the acoustic radiation force. The scattering of the acoustic field off the particles results in a three dimensional acoustic radiation force, which acts as a three-dimensional trapping field. The acoustic radiation force is proportional to the particle volume (e.g. the cube of the radius). It is proportional to frequency and the acoustic contrast factor. It also scales with acoustic energy (e.g. the square of the acoustic pressure amplitude). The sinusoidal spatial variation of the force is what drives the particles to the stable positions of the standing waves. When the acoustic radiation force exerted on the particles is stronger than the combined effect of fluid drag force and buoyancy/gravitational force, the particle is trapped within the acoustic standing wave field. The action of the acoustic forces on the trapped particles results in concentration, agglomeration and/or coalescence of particles and droplets. Heavier-than-water (i.e. denser than water, such as red blood cells) particles are separated through enhanced gravitational settling, and lighter-than-water particles (e.g. lipids) are separated through enhanced buoyancy.

Acoustophoretic Phase Separator

Experiments have been carried out with acoustophoretic particle separators in which fluid passed through a flow chamber, and separation of oil/particles from the fluid was achieved.

Figure 3:
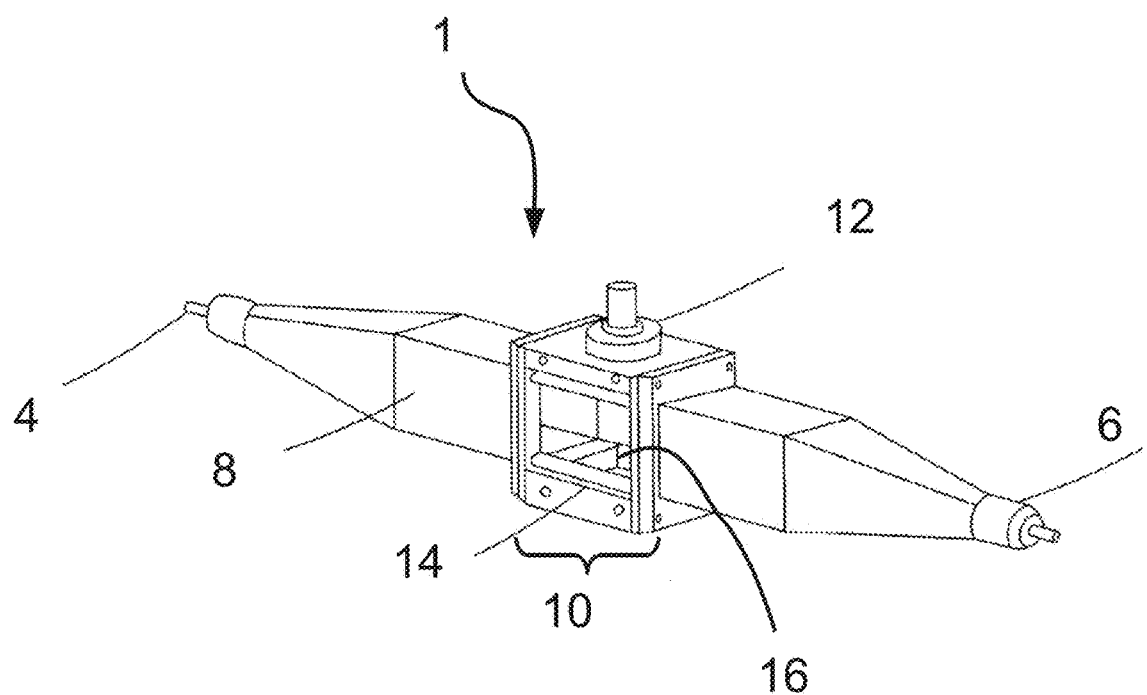
FIG. 3 shows an acoustophoretic separator having a flow chamber with one transducer.

A schematic representation of one such embodiment of an acoustophoretic particle separator 1 for use with a continuous flow system is shown in FIG. 3. This separator is shown primarily to explain the operation of the separator. A multi-component liquid stream (e.g. water or other fluid) enters the inlet 4 and separated fluid exits at the opposite end via outlet 6. It should be noted that this liquid stream is usually under pressure when flowing through the separator. The particle separator 1 has a longitudinal flow channel 8 that carries the multi-component liquid stream and passes through a resonator 10. The resonator 10 includes a transducer 12 or, in some embodiments, an array of transducers, which acts as an excitation source of acoustic waves. The acoustic resonator 10 has a reflector 14, which is located on the wall opposite the transducer 12. A collection pocket 16 collects impurities, and is also located opposite the transducer. As defined herein, impurities includes particles or fluids distinct from the host fluid. The acoustic resonator 10 is designed to maintain a high intensity three-dimensional acoustic standing wave. The system is driven by a function generator and amplifier (not shown). The system performance is monitored and controlled by a computer.

Figure 4:
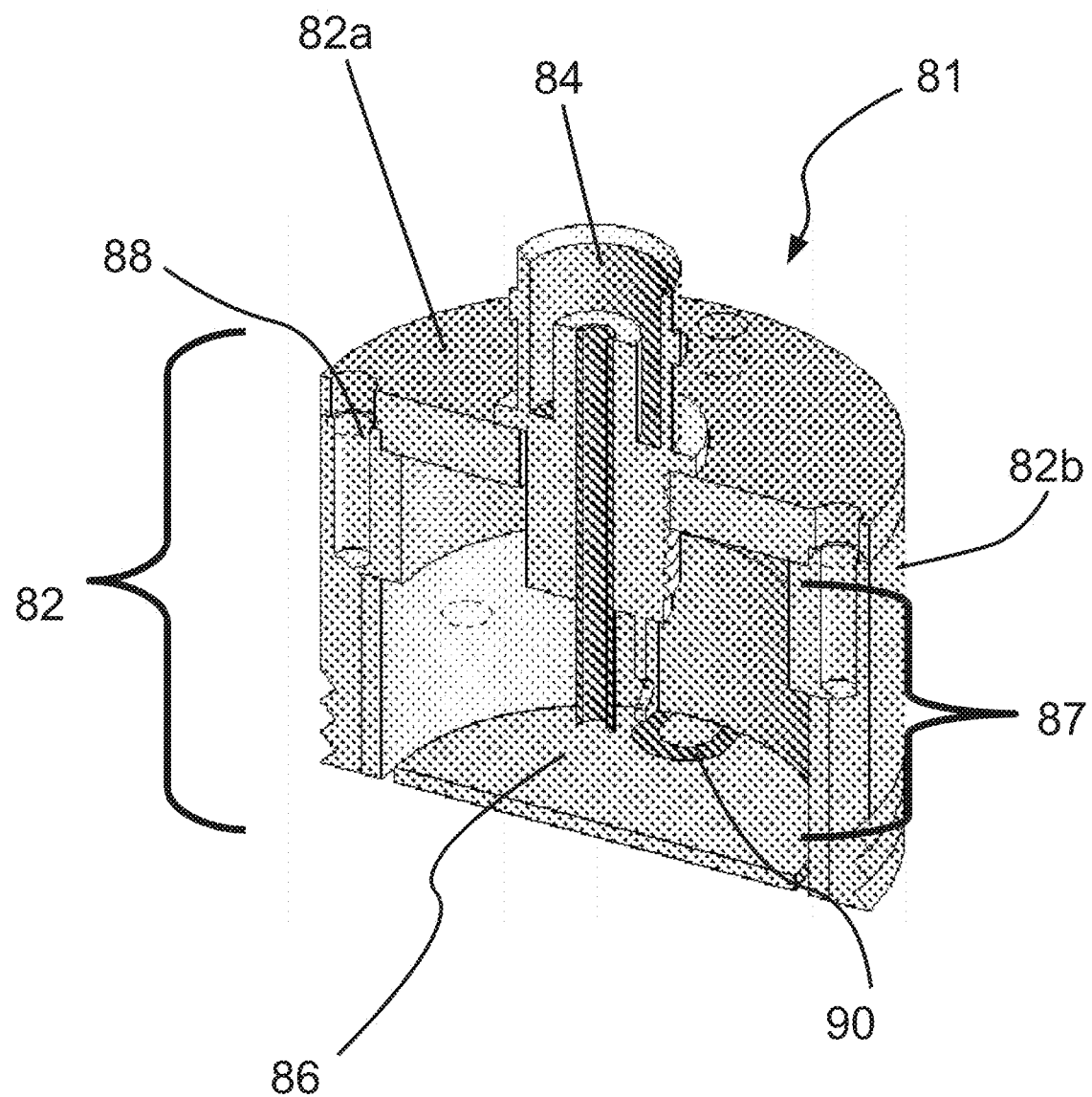
FIG. 4 is a cross-sectional diagram of an ultrasonic transducer of the present disclosure. An air gap is present within the transducer, and no backing layer is present.

FIG. 4 is a cross-sectional view of an ultrasonic transducer 81 of the present disclosure, which can be used with the acoustophoretic separators of the present disclosure. Transducer 81 has an aluminum housing 82. A PZT crystal 86 defines the bottom end of the transducer, and is exposed from the exterior of the housing. The crystal is supported on its perimeter by the housing. Excitation frequencies typically in the range from hundreds of kHz to several MHz are applied by transducer 22.

Figure 2:
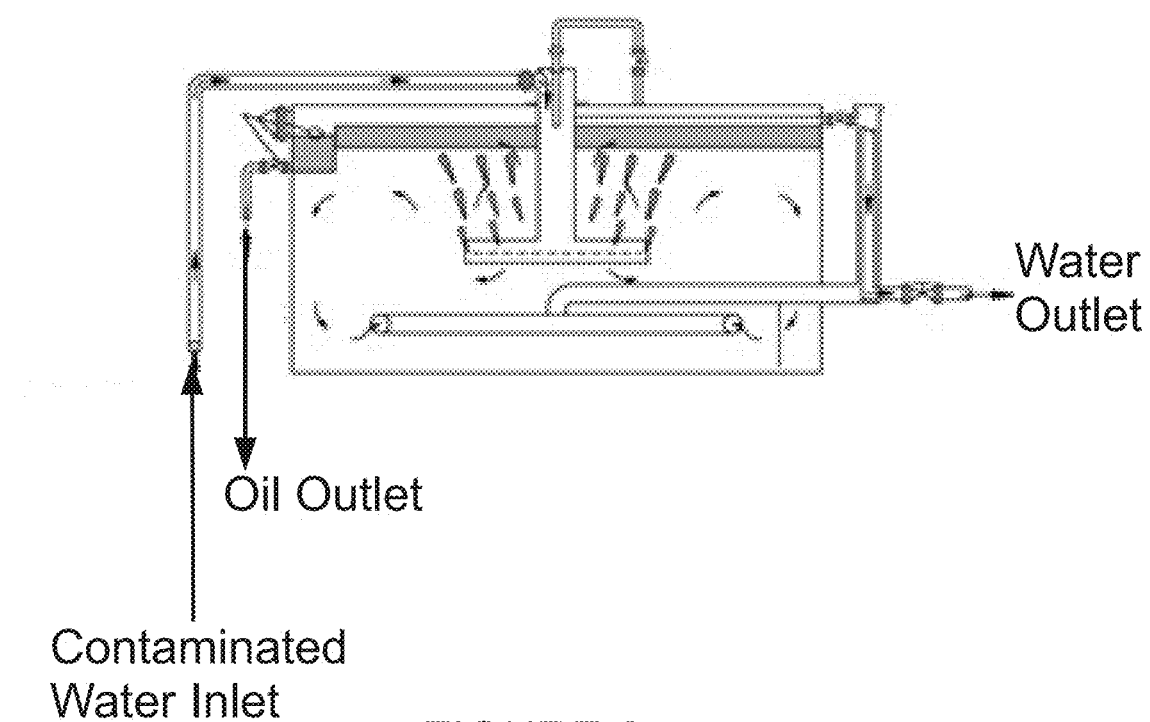
FIG. 2 is a side cross-sectional view of a conventional skim tank.

Screws (not shown) attach an aluminum top plate 82a of the housing to the body 82b of the housing via threads 88. The top plate includes a connector 84 to pass power to the PZT crystal 86. Electrical power is provided to the PZT crystal 86 by electrical lead 90. Note that the crystal 86 has no backing layer. Put another way, there is an air gap 87 in the transducer between aluminum top plate 82a and the crystal 86. A minimal backing may be provided in some embodiments. The transducer is enclosed in a watertight housing 30 (see FIG. 2).

The transducer design affects performance of the system. A typical transducer is a layered structure with the ceramic crystal bonded to a backing layer and a wear plate. Because the transducer is loaded with the high mechanical impedance presented by the standing wave, the traditional design guidelines for wear plates, e.g., half or quarter wavelength thickness, and manufacturing methods may not be appropriate. Rather, in one embodiment of the present disclosure the transducers have no wear plate or backing, allowing the crystal to vibrate with a high Q-factor. In this regard, the Q-factor describes the sound emanating from the transducer according to the equation $Q=f_0/\text{bandwidth}$, where $f_o$ is the center frequency and the bandwidth is the width of the frequency distribution. A "high-Q" transducer has a relatively small bandwidth and long spatial pulse length. A "low-Q" transducer has a relatively large bandwidth and short spatial pulse length.

The vibrating ceramic crystal/disk is directly exposed to the fluid flowing through the flow chamber. In embodiments, there is a silver electrode on either side of the vibrating crystal. Typically, there is a thin metal layer on both sides of the PZT crystal (that serves as an electrode) so as to excite the transducer.

Removing the backing (e.g. making the crystal air backed) also permits the ceramic crystal to obtain higher order modes of vibration (e.g. higher order modal displacement). In a transducer having a crystal with a backing, the crystal vibrates with a uniform displacement, like a piston. Removing the backing allows the crystal to vibrate in a non-uniform displacement mode. The higher order the mode shape of the crystal, the more nodal lines the crystal has. The higher order modal displacement of the crystal creates more trapping lines, although the correlation of trapping line to node is not necessarily one to one, and driving the crystal at a higher frequency will not necessarily produce more trapping lines.

In some embodiments, the crystal may have a backing that minimally affects the Q-factor of the crystal (e.g. less than 5%). The backing may be made of a substantially acoustically transparent material such as balsa wood or cork which allows the crystal to vibrate in a higher order mode shape and maintains a high Q-factor while still providing some mechanical support for the crystal. In another embodiment, the backing may be a lattice work that follows the nodes of the vibrating crystal in a particular higher order vibration mode, providing support at node locations while allowing the rest of the crystal to vibrate freely. The goal of the lattice work or acoustically transparent material is to provide support without lowering the Q-factor of the crystal.

Placing the crystal in direct contact with the fluid or providing as thin of a wear plate as possible also contributes to the high Q-factor by avoiding the dampening and energy absorption effects of the wear plate. Possible wear layers are chrome, electrolytic nickel, or electroless nickel. Chemical vapor deposition could also be used to apply a layer of poly(p-xylxyene) (e.g. Parylene) or other polymer. Organic and biocompatible coatings such as silicone or polyurethane are also contemplated as a wear surface.

In the systems of the present disclosure, the system is operated at a voltage such that the particles are trapped in the ultrasonic standing wave, i.e., remain in a stationary position. The particles are collected in well defined trapping lines, separated by half a wavelength. Within each nodal plane, the particles are trapped in the minima of the acoustic radiation potential. The axial component of the acoustic radiation force drives the particles, with a positive contrast factor, to the pressure nodal planes, whereas particles with a negative contrast factor are driven to the pressure anti-nodal planes. The radial or lateral component of the acoustic radiation force is the force that traps the particle. In systems using typical transducers, the radial or lateral component of the acoustic radiation force is typically several orders of magnitude smaller than the axial component of the acoustic radiation force. On the contrary, the lateral force in separators can be significant, on the same order of magnitude as the axial force component, and is sufficient to overcome the fluid drag force at linear velocities of up to 1 cm/s. As discussed above, the lateral force can be increased by driving the transducer in higher order mode shapes, as opposed to a form of vibration where the crystal effectively moves as a piston having a uniform displacement. These higher order modes of vibration are similar to the vibration of a membrane in drum modes such as modes (1,1), (1,2), (2,1), (2,2), (2, 3), or (m, n), where m and n are 1 or greater. The acoustic pressure is proportional to the driving voltage of the transducer. The electrical power is proportional to the square of the voltage.

Figure 5:
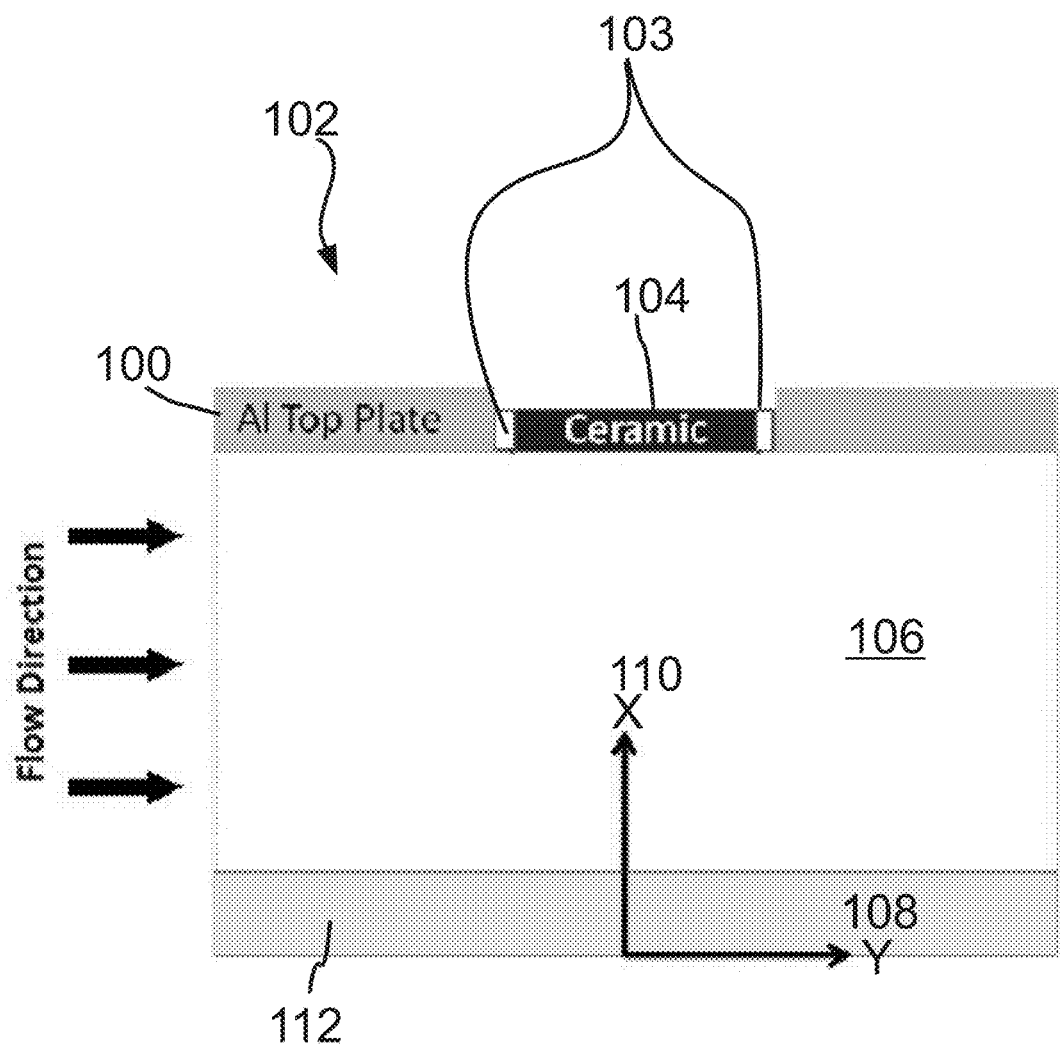
FIG. 5 is a computer model of an acoustophoretic separator simulated to generate FIGS. 6A-6D.

FIG. 5 is a computer model of an acoustophoretic separator 102 simulated to produce FIGS. 6A-6D. The piezo ceramic crystal 104 is in direct contact with the fluid in the water channel 106. In an embodiment for separation of lipids from blood, it is anticipated that a thin wear plate would be used. A layer of silicon 103 is between the crystal 104 and the aluminum top plate 100. A reflector 112 reflects the waves to create standing waves. The reflector is made of a high acoustic impedance material such as steel or tungsten, providing good reflection. For reference, the Y-axis 110 will be referred to as the axial direction. The X-axis 108 will be referred to as the radial or lateral direction. The acoustic pressure and velocity models were calculated in COMSOL including piezo-electric models of the PZT transducer, linear elastic models of the surrounding structure (e.g. reflector plate and walls), and a linear acoustic model of the waves in the water column. The acoustic pressure and velocity was exported as data to MATLAB. The radiation force acting on a suspended particle was calculated in MATLAB using Gor'kov's formulation. The particle and fluid material properties, such as density, speed of sound, and particle size, are entered into the program, and used to determine the monopole and dipole scattering contributions. The acoustic radiation force is determined by performing a gradient operation on the field potential U, which is a function of the volume of the particle and the time averaged potential and kinetic energy of the acoustic field.

Figure 6A:
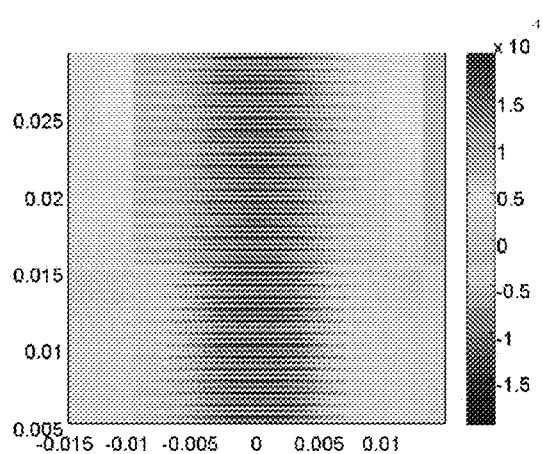
FIGS. 6A-6D is a simulation of the forces on a particle in an acoustophoretic separator.
Figure 6B:
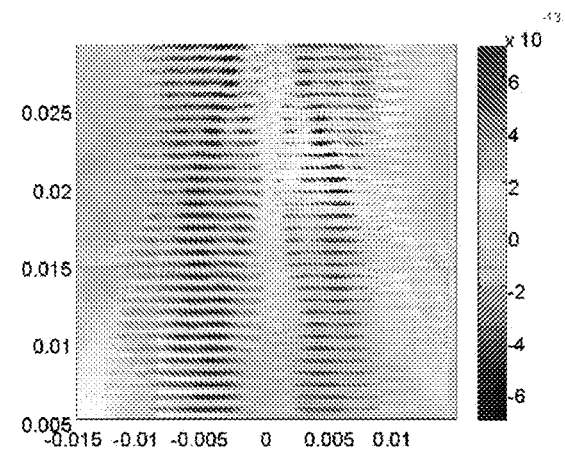
Figure 6C:
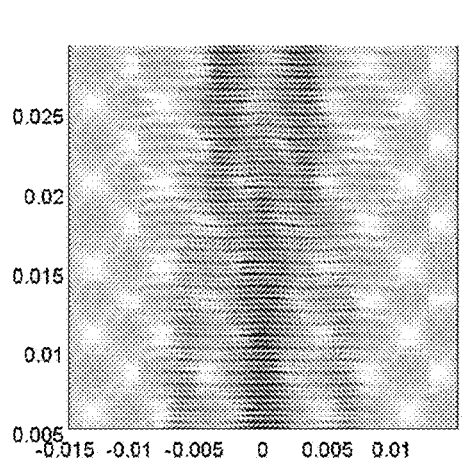
Figure 6D:
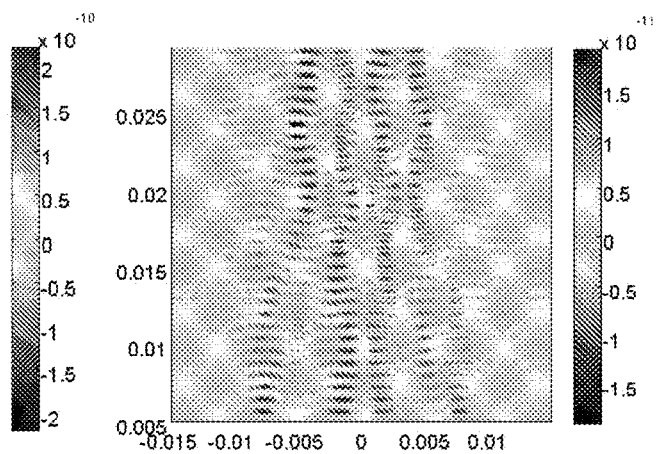

FIGS. 6A-6D show simulations of the difference in trapping between a single acoustic wave and a multimode acoustic wave. FIG. 6A shows the axial force associated with a single standing acoustic wave. FIG. 6B shows the lateral force due to a single standing acoustic wave. FIGS. 6C and 6D show the axial force and lateral force, respectively, in a multi-mode (higher order vibration modes having multiple nodes) piezoelectric crystal excitation where multiple standing waves are formed. The electrical input is the same as the single mode of FIGS. 6A and 6B, but the trapping force (lateral force) is 70 times greater (note the scale to the right in FIG. 6B compared to FIG. 6D). The figures were generated by a computer modeling simulation of a 1 MHz piezo-electric transducer driven by 10 V AC potted in an aluminum top plate in an open water channel terminated by a steel reflector (see FIG. 5). The field in FIGS. 6A and 6B is 960 kHz with a peak pressure of 400 kPa. The field in FIGS. 6C and 6D is 961 kHz with a peak pressure of 1400 kPa. In addition to higher forces, the 961 kHz field (FIGS. 6C and 6D) has more gradients and focal spots.

Figure 7:
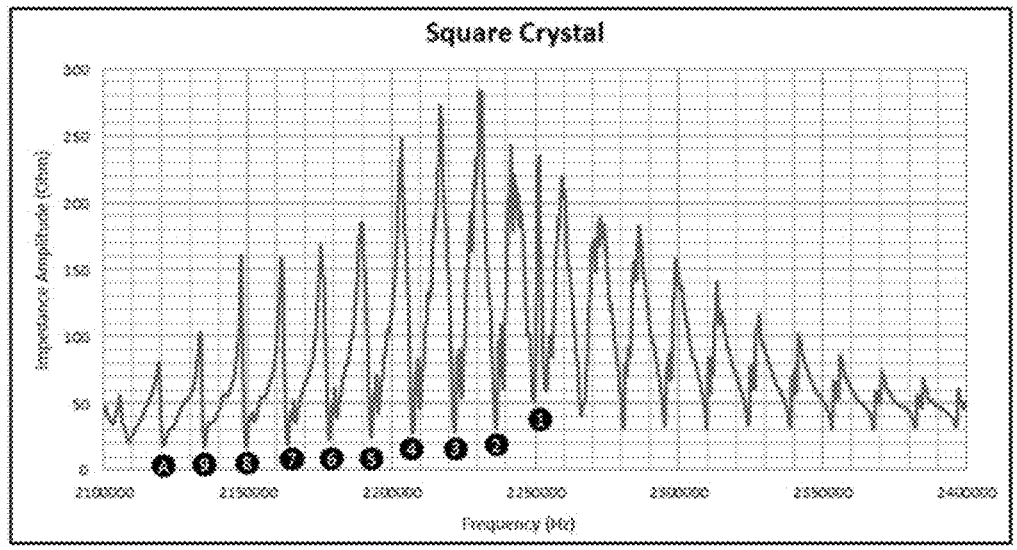
FIG. 7 is a graph of impedance amplitude versus frequency as a square transducer is driven at different frequencies.

In addition to the shape of the transducer, the shape of the mode of the transducer (in what shape the transducer is vibrating) affects oil separation efficiency. Producing more nodes provides more places for oil to be trapped. FIG. 7 shows the measured electrical impedance amplitude of the transducer as a function of frequency in the vicinity of the 2.2 MHz transducer resonance. The minima in the transducer impedance correspond to acoustic resonances of the water column and represent potential frequencies for operation. Numerical modeling has indicated that the transducer displacement profile varies significantly at these acoustic resonance frequencies, and thereby directly affects the acoustic standing wave and resulting trapping force. The transducer displacement mode shape varies from a single half wavelength mode to a three half wavelength mode shape. Higher order transducer modal displacement patterns result in higher trapping forces and multiple stable trapping locations for the captured oil droplets. A single half wavelength mode results in one line of trapped droplets, whereas a three half wavelength mode results in three parallel lines of trapped droplets across the fluid channel.

To investigate the effect of transducer mode shape on acoustic trapping force and oil separation efficiencies, an experiment was repeated ten times, with all conditions identical except for the excitation frequency. Ten consecutive acoustic resonance frequencies, indicated by circled numbers 1-9 and letter A on FIG. 7, were used as excitation frequencies. The conditions were experiment duration of 30 min, a 1000 ppm oil concentration, a flow rate of 500 ml/min, and an applied power of 20W.

Figure 8:
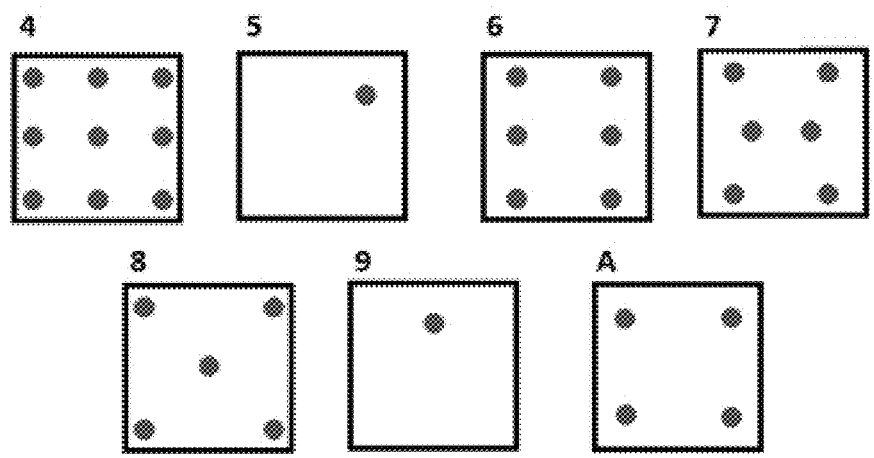
FIG. 8 illustrates the node configurations for seven of the peak amplitudes of FIG. 6.

As the emulsion passed by the transducer, the trapping nodal lines were observed and characterized. The characterization involved the observation and pattern of the number of nodal trapping lines across the fluid channel, as shown in FIG. 8, for seven of the ten resonance frequencies identified in FIG. 7.

The effect of excitation frequency clearly determines the number of nodal trapping lines, which vary from a single trapping line at the excitation frequency of acoustic resonance 5 and 9, to nine trapping nodal lines for acoustic resonance frequency 4. At other excitation frequencies four or five nodal trapping lines are observed. Different modes of vibration of the transducer can produce different (more) nodes of the standing waves, with more nodes generally creating higher trapping forces.

Figure 9:
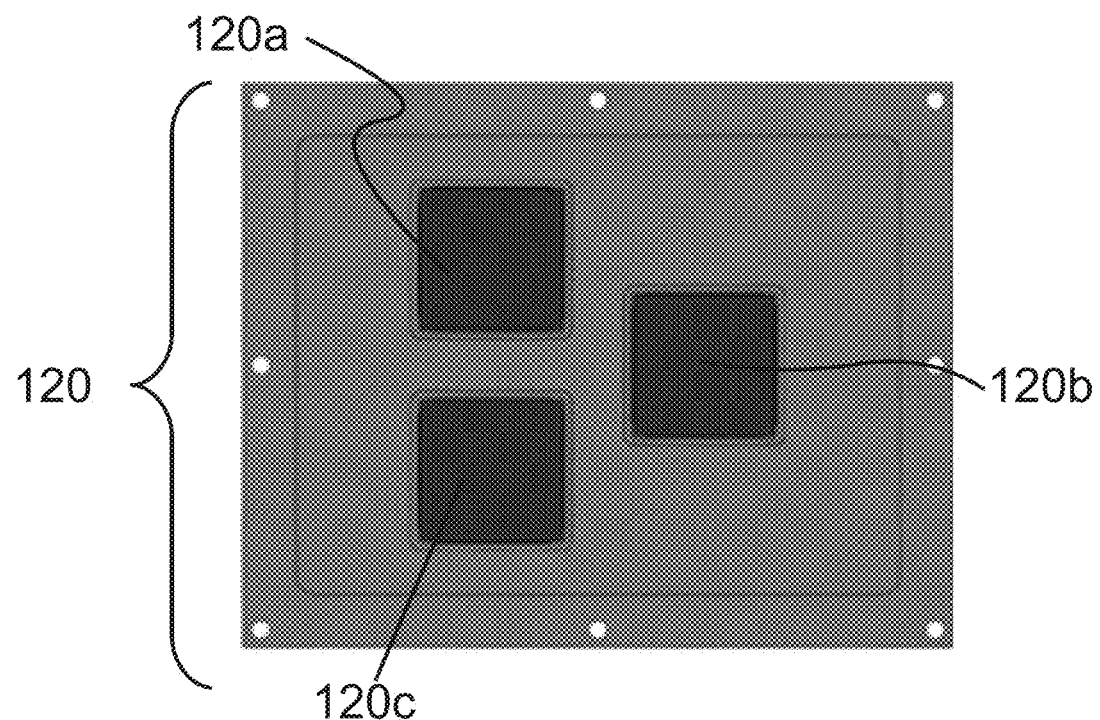
FIGS. 9 and 10 show transducer array configurations.
Figure 10:
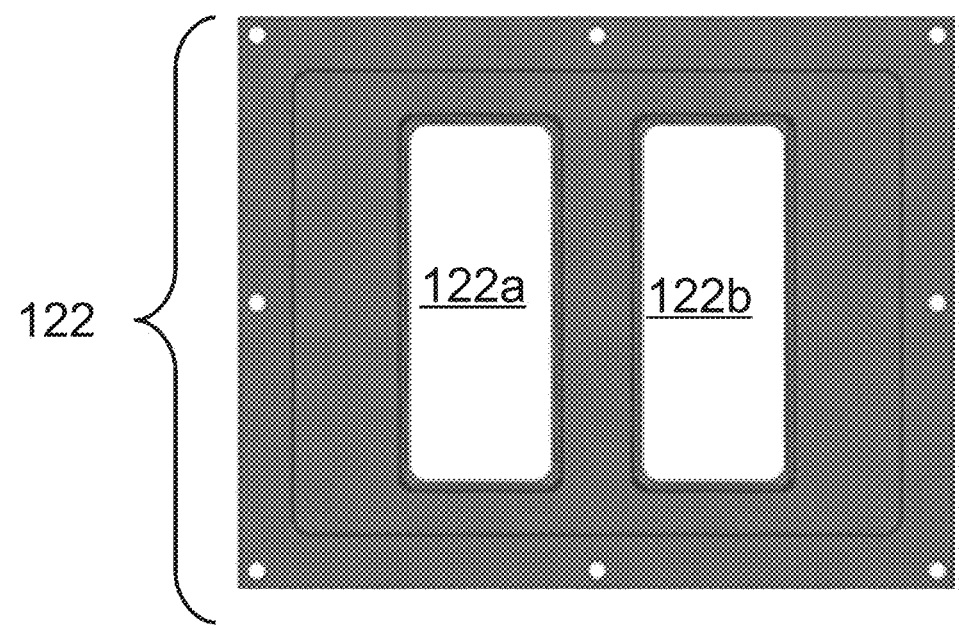

Different transducer arrangements are feasible. FIG. 9 shows a transducer array 120 including three square 1"×1" crystals 120a, 120b, 120c. Two squares are parallel to each other, and the third square is offset to form a triangular pattern. FIG. 10 shows a transducer array 122 including two rectangular 1"×2.5" crystals 122a, 122b arranged with their long axes parallel to each other. Power dissipation per transducer was 10 W per 1"×1" transducer cross-sectional area and per inch of acoustic standing wave span in order to get sufficient acoustic trapping forces. For a 4" span of an intermediate scale system, each 1"×1" square transducer consumes 40 W. The larger 1"×2.5" rectangular transducer uses 100 W in an intermediate scale system. The array of three 1"×1" square transducers would consume a total of 120 W and the array of two 1"×2.5" transducers would consume about 200 W.

Acoustophoretics in Settling Tank or Skimming Tank

The acoustophoretic separators described in FIGS. 3-10 can be adapted to improve the effectiveness of settling tanks and skimming tanks. The removal of dispersed particles or droplets can be enhanced using acoustophoretics. The collection of the particles or droplets within the standing waves results in coalescence of smaller particles/droplets into larger particles/droplets which are more prone to settling or floating, as the case may be. This enhances separation of the particles/droplets from the water, resulting in improved separation for a given residence time. This may also allow the tank to be of a smaller size and still achieve the same separation efficiency.

This would be accomplished with a submersible acoustophoretic separator device. The separator would include a transducer and a reflector opposite the transducer, wherein the fluid in the settling tank or the skim tank, made up of water and suspended particles or droplets, can pass between the transducer and the reflector. This permits the particles/droplets to be trapped in the standing waves thus created. In particular, it is contemplated that the submersible acoustophoretic separator can loiter or float at the top of the tank and cause particles having a diameter of 100 micrometers (μm) or less to agglomerate and precipitate out. It should be noted that only the transducer and the reflector need to be submerged, and the term "submersible" should not be construed to require that the entire device be under the surface of the water. For example, portions of the device can float on the surface. The electrical components of the device would be fully insulated.

Figure 11:
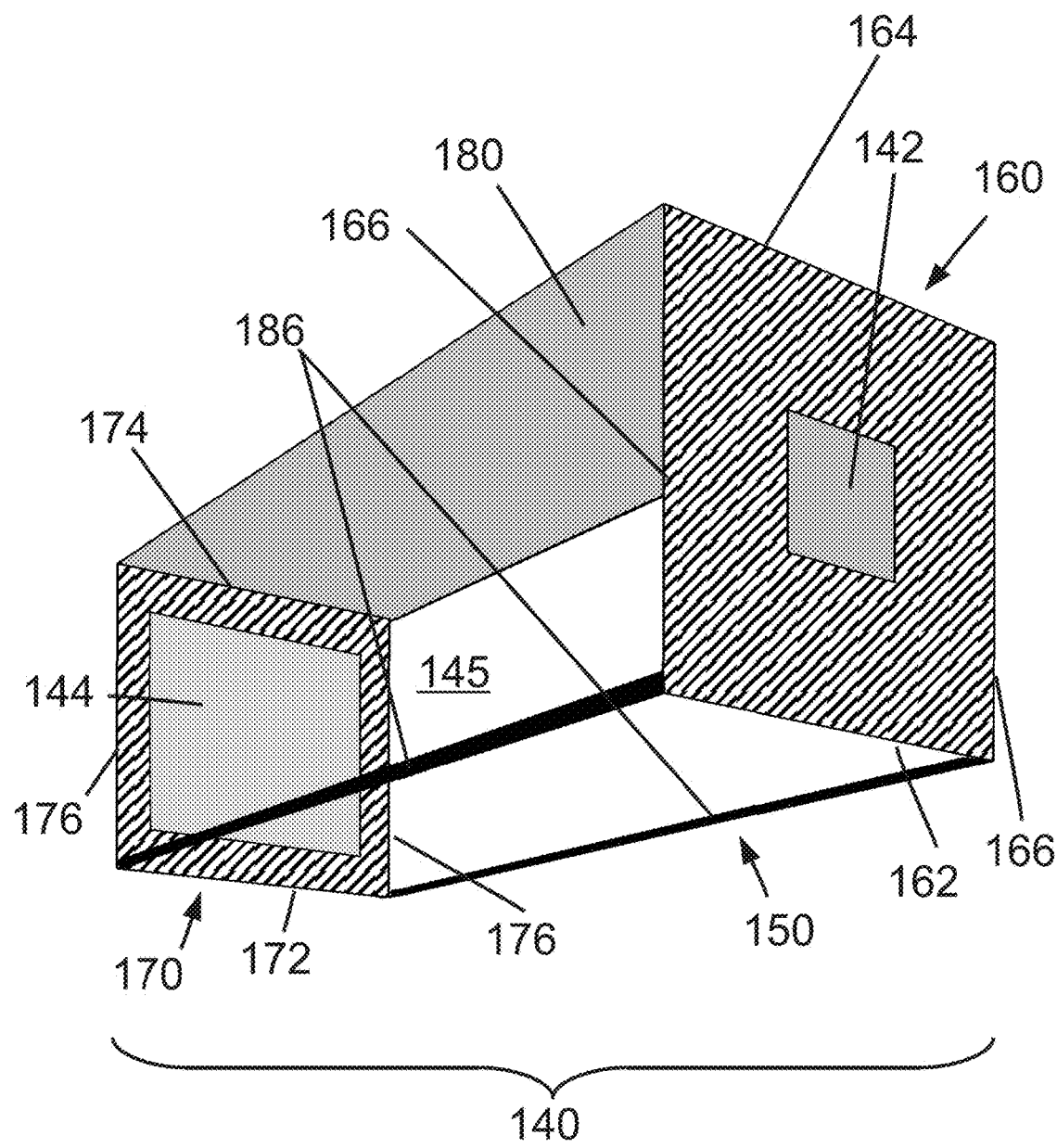
FIG. 11 is a perspective view of one exemplary embodiment of a submersible acoustophoretic separator of the present disclosure, which can be used to cause agglomeration of suspended particles which then sink to the bottom of the tank.

FIG. 11 shows a first exemplary embodiment of a submersible acoustophoretic separator 140 that is useful for agglomerating suspended particles into larger agglomerates that can then settle to the bottom of the tank due to gravity. Generally speaking, the separator 140 includes a housing 150 that has a transducer face 160 and a reflector face 170 opposite the transducer face. The transducer face 160 has an upper edge 164, a lower edge 162, and two side edges 166. Similarly, the reflector face 170 has an upper edge 174, a lower edge 172, and two side edges 176. A transducer 142 is mounted in the transducer face 160. A reflector 144 is mounted in the reflector face 170. A separation area 145 is formed in the space between the two faces, and is the location where the standing waves are formed and where droplet separation from the fluid occurs. It should be noted that the transducer face and the reflector face are depicted as square, though they can be of any shape, e.g. circular, triangular, etc., and need only to be of the proper size to accommodate the transducer and the reflector.

One or more supports join the transducer face and the reflector face together. Two different types of supports are shown here. First, an upper support structure 180 connects the upper edge 164 of the transducer face to the upper edge 174 of the reflector face. Second, support rods 186 connect the lower edge 162 of the transducer face to the lower edge 172 of the reflector face at the corners of the two faces. These supports can be used independently of each other, and in greater numbers as desired. For example, a lower support structure could be used instead of the two support rods illustrated here, or four support rods (one in each corner) could be used instead of an upper support structure.

In some embodiments, the upper support structure 180 is made from two adjustable plates that can slide relative to each other, allowing the distance between the transducer 142 and the reflector 144 to be adjusted. Similarly, the support rods can be telescoping or otherwise adjustable in length as well. This can be advantageous in customizing the separator to be used in different fluids or with different suspended particles or droplets, as such adjustment can be used to change the properties of the standing waves.

It should be noted that the sides and the bottom of the submersible acoustophoretic separator are open. Put another way, the separator 140 is illustrated with three exposed faces. Two of the exposed faces are between the side edges of the transducer face and the reflector face. The third exposed face is between the lower edges of the transducer face and the reflector face. Generally, the submersible separator has at least one exposed face. In particular embodiments with only one exposed face, the exposed face is either a top face or a bottom face. The exposed face(s) allow fluid to freely enter the separation area 145, so that the suspended droplets can be trapped in standing waves and separated from the water. The exposed bottom face here also allows the agglomerated particles in the standing waves to escape the separator once they are of sufficient size to sink to the bottom of the tank.

The orientation of the submersible acoustophoretic separator in the fluid of the tank is generally not important, as long as larger particles/droplets can escape the standing waves without being trapped on the housing. However, the housing can be designed to take any particularly desired orientation. For example, if it is desired to make the upper edge 164 a top edge (i.e. always on top) and the lower edge 164 a bottom edge, this could be achieved by making the upper support structure 180 lighter than the support rods 186, for example by placing air pockets in the support structure. Alternatively, a flotation device could be attached to the upper edges of the transducer face 160 and the reflector face 170 to make the top lighter than the bottom.

As illustrated in FIG. 11, the separator 140 is designed for the separation of suspended solids. For the separation of oil droplets, the separator 140 may be flipped upside down, such that the exposed face is on the top of the housing.

Figure 12:
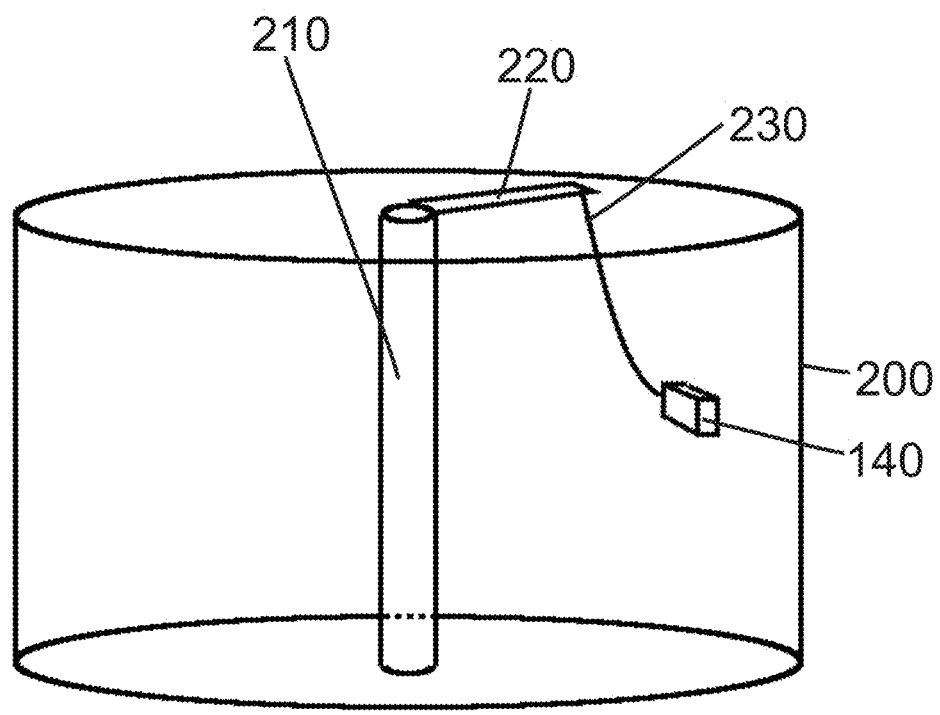
FIG. 12 is a diagram illustrating a submersible acoustophoretic separator suspended from a boom in a tank.

FIG. 12 illustrates one way in which the separator 140 can be used. Here, the tank 200 includes a central support 210 and a skimming arm 220 which rotates about the central support. The separator 140 is powered by and connected to the skimming arm by a power cable 230. The skimming arm acts as a boom, and the separator is suspended from the boom. This movement causes fresh fluid to enter the separator so that the suspended particles can be removed from the fluid and agglomerated. While the separator is depicted here on a relatively long cable in the middle of the tank, of course the separator could be attached to the skimming arm itself, or the cable could be made much shorter, to bring the separator closer to the top of the fluid. The separator could also be made stationary, with fluid being circulated in the tank to move fluid through the separator and permit agglomeration.

Figure 13:
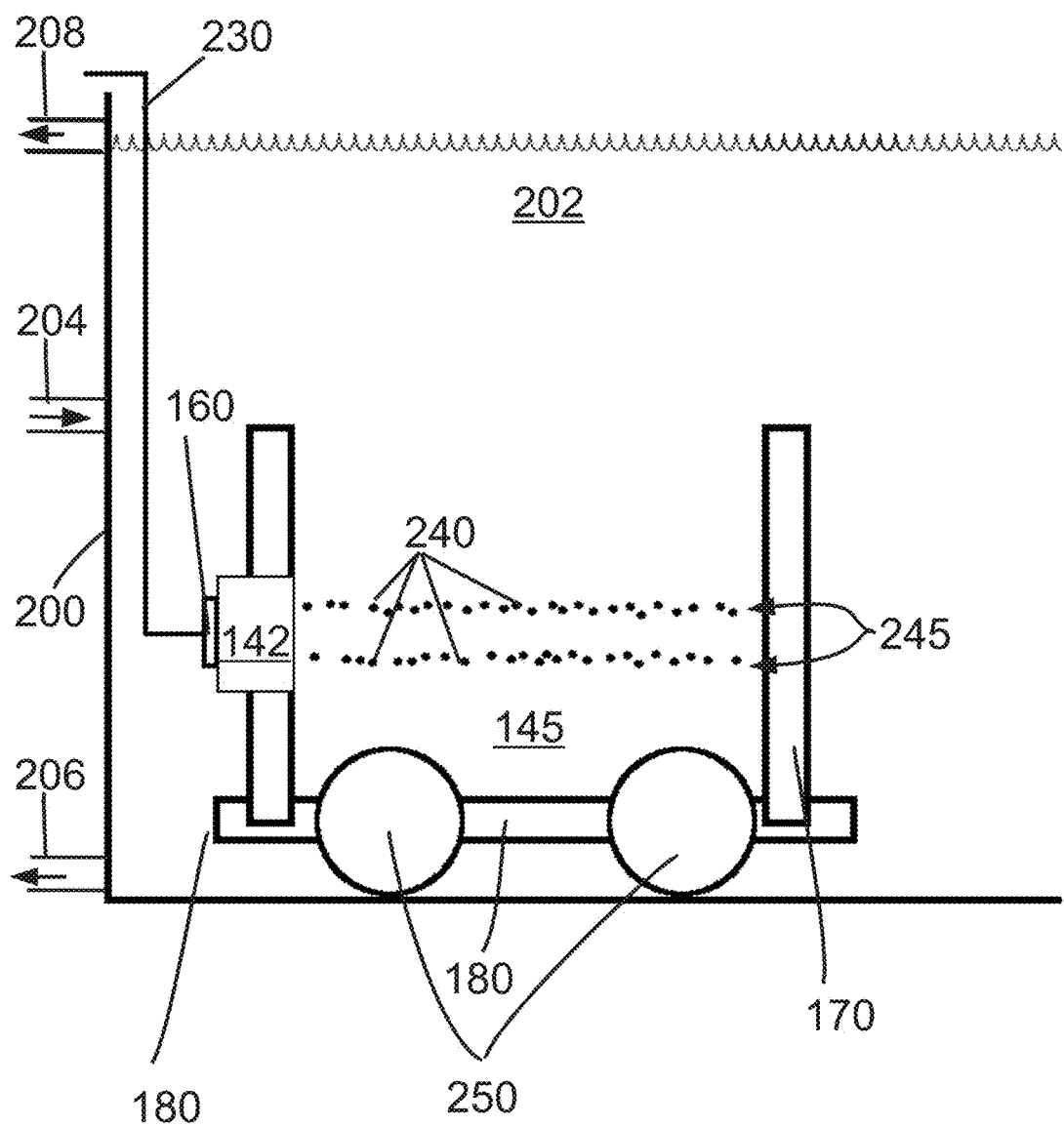
FIG. 13 is a side view of a second exemplary embodiment of a submersible acoustophoretic separator of the present disclosure, having wheels for self-locomotion and used for coalescing droplets that can then rise to the top of the tank.

Another exemplary embodiment of an acoustophoretic separator device 140 is shown in FIG. 13. Compared to FIG. 11, this separator is turned upside down and is used in coalescing oil droplets for floating to the top of the tank. Here, the separator 140 is submerged in a tank 200 containing fluid 202 (not shown to scale). The tank includes an influent line 204 through which the water/oil mixture enters, a water effluent line 206 at the bottom of the tank, and an oil effluent line 208 at the top of the tank. The skimming arm is not illustrated.

Again, the separator includes the transducer face 160 with transducer 142, the reflector face 170 with reflector (not shown), and the lower support structure 180. The sides and the top of the separator are open and exposed to the fluid. In the separation area 145, small droplets 240 are trapped at the nodes 245 of the standing waves and coalesce, allowing buoyant particles to float to the top.

In the embodiment illustrated here, the separator is mobile and may be self-propelled. The separator has wheels 250 (or treads) mounted upon the lower support structure 180 which propel the separator around the tank. This allows the separator to move throughout the entire settling zone of the tank and continuously expose itself to relatively high concentrations of dispersed oil droplets, rather than being fixed in one location whose concentration of droplets is eventually depleted.

As illustrated, power is supplied by a waterproof electrical cable 230 which connects to the transducer face 160. The watertight electrical housing may contain an electrical connector such as a BNC cable. It is also contemplated that the separator could have an independent power source, e.g. a battery.

Figure 14:
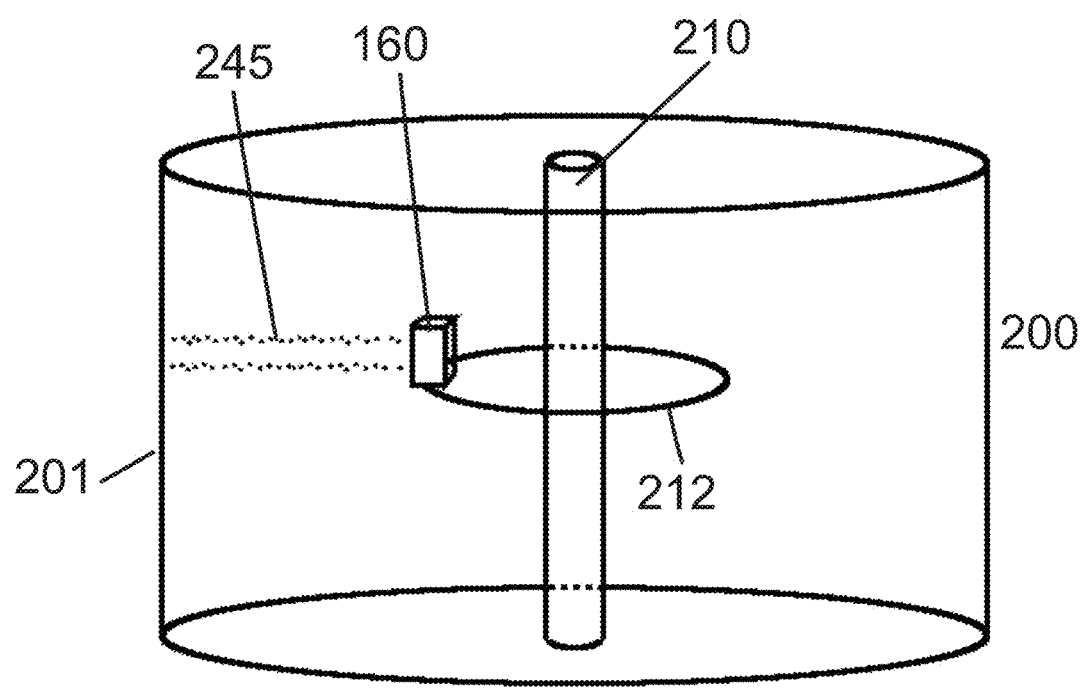
FIG. 14 is a side view of a third exemplary embodiment of a submersible acoustophoretic separator of the present disclosure, wherein the transducer is mounted on a track and the wall of the tank acts as the reflector.

FIG. 14 illustrates another exemplary embodiment of the acoustophoretic separator. Here, the wall 201 of the tank 200 acts as the reflector for the separator. The transducer face 160 containing the transducer is mounted upon a track 212, which is shown here as being mounted on the central support 210. It is contemplated that the standing waves are formed between the transducer and the tank wall 201, forming the nodal lines 245 where the particles/droplets are agglomerated/coalesced.

Figure 15:
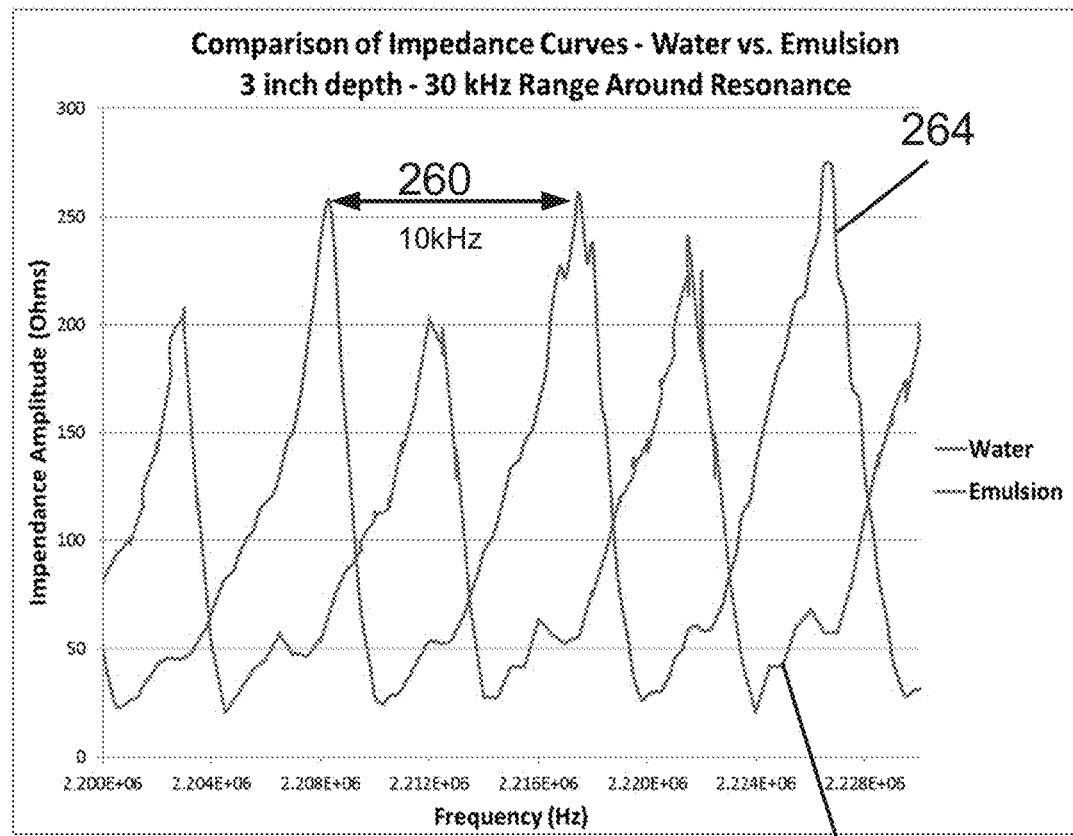
FIG. 15 is a graph of impedance amplitude vs. frequency for water and an emulsion, showing a shift in resonance frequency.

FIG. 15 is a graph of impedance amplitude versus frequency, and helps illustrate why adjusting the distance between the transducer and the reflector may be helpful. One line 262 is for water, and one line 264 is for an oil/water emulsion. The water line has three peaks at roughly 2.208 MHz, 2.218 MHz, and 2.226 MHz, and around 250 ohms amplitude. The emulsion line has three peaks at roughly 2.202 MHz, 2.212 MHz, and 2.230 MHz with an amplitude of about 200 ohms, and a fourth peak at about 2.222 MHz with an amplitude of around 240 ohms. As seen here, a shift in impedance amplitude occurs due to changes in the speed of sound of the emulsion. The arrow 260 indicates 10 kHz modulations, the distance between resonance frequencies (the peaks). Because of this shift in impedance, a change in reflector distance is useful for different emulsion concentrations. Larger shifts will occur with higher emulsion concentrations.

In experiments in which there was no agitation of the tank to simulate actual settling tank conditions, particles were first visible after three minutes of operation. In the experimental setup, the system used a 1 inch PZT-8 2 MHz transducer with interchangeable round and square transducers. The adjustable reflector was stainless steel and air backed. The support structure had grooves to adjust the distance to 3 inches, 6 inches, and 12 inches. The shorter reflector distances were more effective in this setup. The tested emulsion was water and SAE-30 motor oil at a concentration of 400 ppm, having a density of 888 kg/m$^3$. Droplets ranged from 2 to 25 microns. The droplets were created by shearing oil droplets in a pump. If left unagitated, the emulsion was stable over several days. After the particles became visible at the standing waves after 3 minutes, the oil droplets reached critical mass and were released after 15 minutes (the buoyancy of the oil droplets was sufficient to cause the oil to float to the top). Particle collection showed accumulations through 45 minutes. Once the acoustics were turned off, the captured droplets rose to the surface. In some embodiments, an acoustic separator having an on/off cycle of several minutes is contemplated. The testing frequency was 2.2163 MHz.

The open-style system was shown to be feasible, with oil droplets able to reach a critical mass and rise to the top. The fluid circulation increased the particle capture rate. Shorter reflector distances generally provided better separation.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A method of accelerating separation in a tank or vessel, the method comprising:

placing a submersible acoustophoretic separator in the tank or vessel, the acoustophoretic separator having (i) a housing having (a) a transducer on a transducer face, (b) a reflector on a reflector face opposite the transducer face, (c) a support joining the transducer face and the reflector face, and (d) at least one exposed face that allows fluid to enter a separation area located between the transducer face and the reflector face;

providing a fluid in the tank or vessel, the fluid having a first density and containing particles or droplets having a different density;

applying acoustic energy to the fluid with the transducer to create a multimode acoustic standing wave between the transducer and the reflector, wherein the fluid is separated from the particles or droplets by the multimode acoustic standing wave, and wherein the multimode acoustic standing wave results in an acoustic radiation force having an axial force component and a lateral force component that are of the same order of magnitude.

2. The method of claim 1, wherein the standing wave creates nodal lines and lateral forces that trap the particles or droplets in the nodal lines.

3. The method of claim 2, wherein the particles or droplets trapped in the nodal lines coalesce or agglomerate such that the particles or droplets are separated from the fluid.

4. The method of claim 3, wherein the at least one exposed face of the submersible acoustophoretic separator is a top face, allowing the trapped particles or droplets to exit the separator as they coalesce or agglomerate.

5. The method of claim 1, wherein the fluid is circulated in the tank or vessel to move fluid through the separator.

6. The method of claim 1, wherein the fluid is flowed between the transducer and the reflector.

7. The method of claim 1, wherein the transducer includes a ceramic crystal made of PZT-8.

8. The method of claim 1, wherein the housing is adjustable to vary the distance between the transducer and the reflector.

9. The method of claim 1, wherein the support includes an upper support plate connecting an upper edge of the transducer face to an upper edge of the reflector face and support rods connecting a lower edge of the transducer face to a lower edge of the reflector face.

10. The method of claim 9, wherein the housing includes wheels or treads for propelling the separator on the bottom of the tank or vessel.

11. The method of claim 9, wherein the housing includes a flotation device.

12. The method of claim 9, wherein the separator is suspended from a boom that rotates about a central support.

13. The method of claim 1, wherein the support is a set of support rods connecting a lower edge of the transducer face to a lower edge of the reflector face.

14. The method of claim 1, wherein the support is an upper support structure connecting an upper edge of the transducer face to an upper edge of the reflector face.

15. The method of claim 1, wherein the housing includes wheels or treads for propelling the separator on the bottom of the tank or vessel.

16. The method of claim 1, wherein the submersible acoustophoretic separator further comprises a flotation device.

17. The method of claim 13, wherein each of the support rods is a telescoping support rod.

18. The method of claim 1, wherein the transducer creates a three-dimensional acoustic standing wave.

19. The method of claim 1, wherein the submersible acoustophoretic separator includes a total of three exposed faces.

20. The method of claim 3, wherein the at least one exposed face of the submersible acoustophoretic separator is a bottom face, allowing the agglomerated particles or droplets in the standing waves to exit the separator once they are of sufficient size to sink to a bottom of the tank or vessel.

21. A method of separation in a tank or vessel, comprising:

placing a submersible acoustophoretic separator in the tank or vessel, the acoustophoretic separator having (i) a housing having (a) at least one transducer and (b) at least one reflector;

wherein the tank or vessel contains a host fluid and at least one secondary phase;

wherein the transducer is composed of a piezoelectric material and the reflector is made of a high acoustic impedance material;

applying acoustic energy to the fluid with the transducer to create a multimode acoustic wave;

reflecting the multimode acoustic wave from the reflector, thereby creating a multimode acoustic standing wave, wherein the multimode acoustic standing wave is exposed to the host fluid and the at least one secondary phase in the tank or vessel; and separating the at least one secondary phase from the host fluid in an accelerated manner due to exposure to the multimode acoustic standing wave; and wherein the multimode acoustic standing wave results in an acoustic radiation force having an axial force component and a lateral force component that are of the same order of magnitude.

22. The method of claim 21, wherein the submersible acoustophoretic separator includes a total of three exposed faces that allow the host fluid and the at least one secondary phase to enter a separation area located between the transducer and the reflector.

23. The method of claim 21, wherein the multimode acoustic standing wave is a three-dimensional acoustic standing wave.

24. A method of accelerating separation in a tank or vessel, comprising:

placing an acoustophoretic separator in the tank or vessel, the acoustophoretic separator having (i) a housing having (a) at least one transducer and (b) at least one reflector;

wherein the tank or vessel contains (i) a host fluid and (ii) (a) dispersed particles or (b) a secondary fluid;

wherein the transducer is composed of a piezoelectric material and the reflector is made of a high acoustic impedance material;

applying acoustic energy to the host fluid with the transducer to create a multimode acoustic wave;

reflecting the multimode acoustic wave from the reflector, thereby creating a multimode acoustic standing wave, wherein the multimode acoustic standing wave is exposed to the host fluid and the dispersed particles or secondary fluid in the tank or vessel; and coalescing, agglomerating, or precipitating the dispersed particles or secondary fluid into larger particles or droplets so that the larger particles or droplets settle or float out of the host fluid in an accelerated manner due to exposure to the multimode acoustic standing wave;

wherein the multimode acoustic standing wave results in an acoustic radiation force having an axial force component and a lateral force component that are of the same order of magnitude.

25. The method of claim 24, wherein the acoustic separator floats on the surface of the host fluid.

26. The method of claim 24, wherein the acoustic separator is submerged in the host fluid.

27. The method of claim 24, wherein the multimode acoustic standing wave is a three-dimensional acoustic standing wave.

* * * * *